Sept. 30, 1924.
J. NEWSOM ET AL
1,509,900
MEASURING AND AUTOMATIC KNOCK-OFF DEVICE
Filed Sept. 13, 1921    2 Sheets-Sheet 1
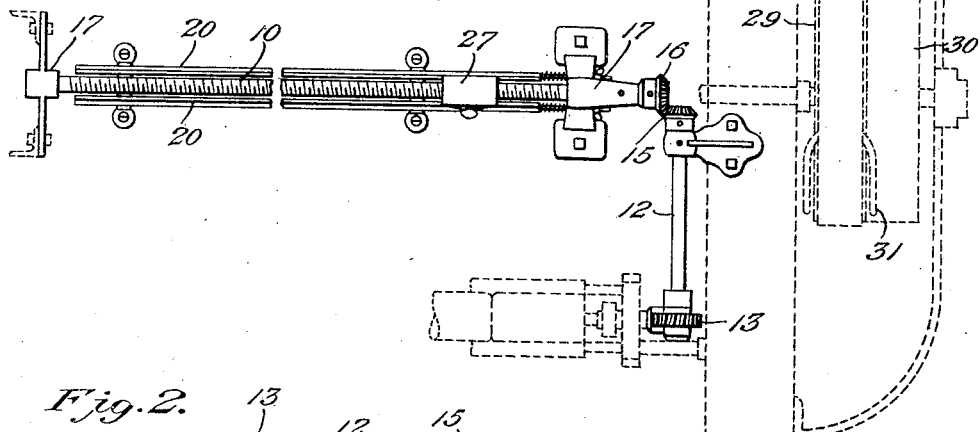
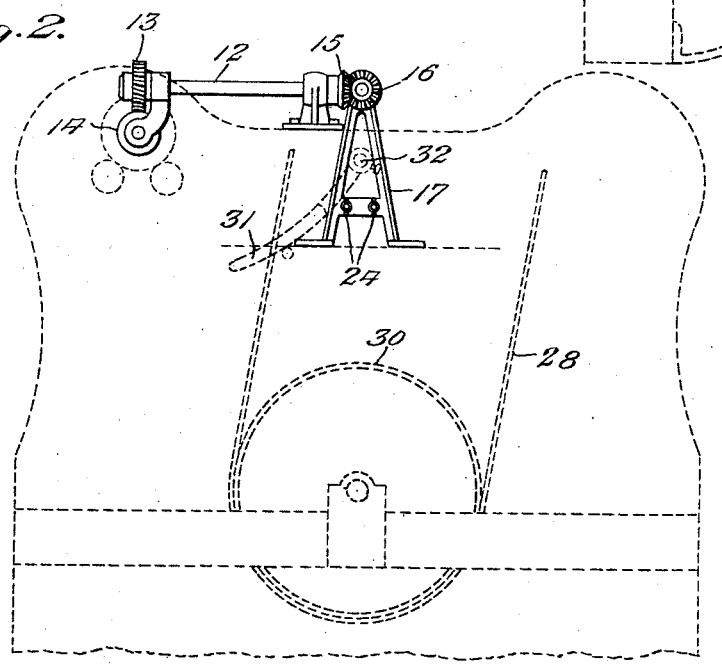
J. Newsom
C. P. Deal
INVENTORS
BY Victor J. Evans
ATTORNEY
WITNESS: Edwin G. McKee Sept. 30, 1924.  
J. NEWSOM ET AL  
1,509,900  
MEASURING AND AUTOMATIC KNOCK-OFF DEVICE  
Filed Sept. 13, 1921    2 Sheets-Sheet 2
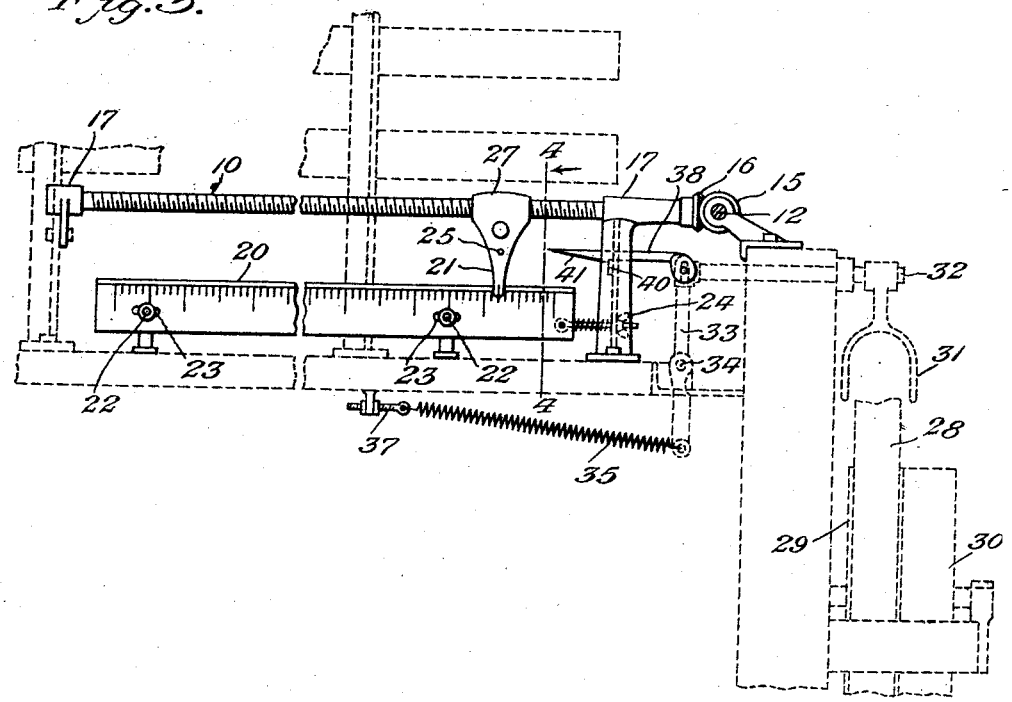
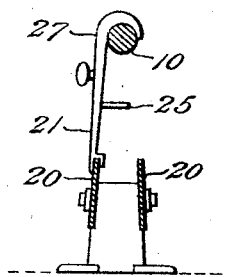
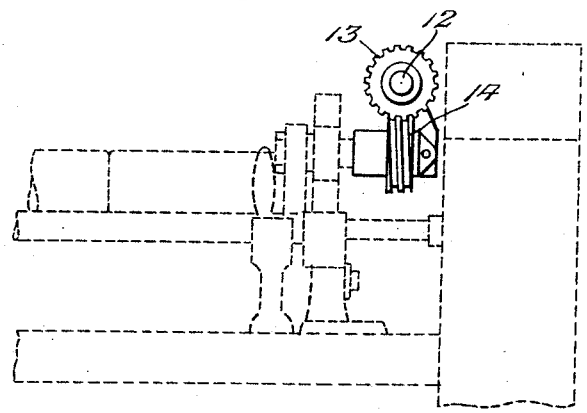
J. Newsom  
C. P. Deal  
INVENTORS  
BY Victor J. Evans  
ATTORNEY
WITNESS: Edwin G. McKee Patented Sept. 30, 1924.

1,509,900

UNITED STATES PATENT OFFICE.

JAMES NEWSOM AND CALEB P. DEAL, OF LAGRANGE, GEORGIA; SAID NEWSOM ASSIGNOR TO UNITY COTTON MILLS, OF LAGRANGE, GEORGIA, A CORPORATION OF GEORGIA.

MEASURING AND AUTOMATIC KNOCK-OFF DEVICE.

Application filed September 13, 1921. Serial No. 500,344.

*To all whom it may concern:*

Be it known that we, JAMES NEWSOM and CALEB P. DEAL, citizens of the United States, residing at Lagrange, in the county of Troup and State of Georgia, have invented new and useful Improvements in Measuring and Automatic Knock-Off Devices, of which the following is a specification.

This invention relates to a measuring and automatic knock-off device for textile machinery, and the object is to provide an attachment of the type indicated for use in connection with twisting frames, spinning frames, warpers, beamers, cloth finishing machines, etc.

A further object is to provide means whereby a specified number of yards of yarn may be wound on a bobbin in a continuous length, thereby eliminating respooling of the yarn before beaming and avoiding the presence of knots.

A still further object is to provide an attachment including the graduated scale and cooperating pointers which may be applied to each side of the twisting frame, permitting the two sides to be operated independently and with different lengths of yarn, if desired.

Briefly described, the attachment includes a main screw suitably driven, a scale adjustable longitudinally, a pointer cooperating with the scale and adapted to be set at a predetermined point indicating a specified number of yards, the pointer carrying a threaded element movable by the screw and carrying an element for operating a knock-off device for shifting the driving belt to a loose pulley.

The main screw 10 is driven in any suitable manner incident to the operation of the machine, and in the drawings we have shown a shaft 12 carrying a worm wheel 13, this wheel cooperating with a worm 14. The shaft 12 carries a beveled gear wheel 15 meshing with a bevel gear wheel 16 rigid with reference to the screw 10. The opposite end of the screw is mounted in bearing 17. A scale 20 is suitably graduated and the pointer 21 cooperating with the scale indicates the number of yards of yarn to be wound on a given bobbin. The scale is mounted on pins 22 passing through slots 23, these slots permitting the scale to be adjusted longitudinally by means of screw 24. The pointer carries a pin 25 for the purpose indicated below and connected with the pointer or formed integrally therewith is a threaded element 27 cooperating with the screw 10. This element may be set at any desired position on the screw so that the pointer will indicate the number of hundred yards of yarn to be wound. A belt forming a part of the main driving mechanism is designated 28, a driving pulley is shown at 29 and a loose pulley at 30.

A belt shifting device 31 is mounted on an arm or rod 32 pivotally connected with the lever 33, this lever being fulcrumed at 34 and having connected with the opposite end a tension spring 35, acting as a shipper spring. The spring is adjustable by means of the connections shown at 37.

A trigger 38 is connected with a lever 33 at the point shown and is retained in operative position by means of the cooperating knife edges illustrated at 40. The end portion of the trigger is beveled on the under side as shown at 41, the pin 25 cooperating with the beveled portion and acting to release the trigger and allow the spring 35 to operate the belt shifting device, acting as an automatic knock-off attachment.

As previously intimated, in practice a pointer and scale may be provided for each side of the twisting machine. The scale or scales are first adjusted longitudinally by means of adjusting screws, in order that the zero marks on the scale may be opposite the pointer when the elements are in unlocked position, that is when the pin 25 is in position for releasing the trigger. The pointer 21 and threaded element 27 are then shifted to the required point on the screw so that the pointer will indicate the number of yards to be run on the twisting machine. After the end of the yarn is made fast to the particular bobbin, the machine is set in operation and the traveling pointer moves along the screw until the required amount of yarn has been wound, and the automatic knock-off device is set in operation by the pin 25 coming in contact with the trigger and producing the results stated.

What is claimed is:

In a device of the class described, a driven element, a scale parallel therewith, a combined pointer and trigger release movable by the operation of said element in a path parallel with the scale, said pointer and release being in a line perpendicular to the scale, a trigger having one end positioned to indicate the point on the scale at which the trigger release will be effective, a lever pivoted intermediate of its ends and having connection at one end with the trigger, a belt shifting device also connected with said end of the lever, and a spring connected with the opposite end of the lever, for throwing the latter when released by the trigger.

In testimony whereof we affix our signatures.

JAMES NEWSOM.
CALEB P. DEAL.